United States Patent [19]

Headley

[11] Patent Number: 4,572,790
[45] Date of Patent: Feb. 25, 1986

[54] LUBRICATION ADDITIVE FOR AQUEOUS DRILLING FLUIDS

[75] Inventor: James A. Headley, Missouri City, Tex.

[73] Assignee: Texaco Inc., White Plains, N.Y.

[21] Appl. No.: 606,043

[22] Filed: May 2, 1984

[51] Int. Cl.$^4$ .................... C09K 7/00; C01M 3/32; C01M 3/42

[52] U.S. Cl. .................. 252/8.5 A; 252/8.5 C; 252/46.6; 252/49.3; 252/49.5; 252/49.8

[58] Field of Search ............... 252/8.5 A, 8.5 C, 46.6, 252/49.3, 49.5, 49.8

[56] References Cited

U.S. PATENT DOCUMENTS

| | | | |
|---|---|---|---|
| 2,993,857 | 7/1961 | Sudholz | 252/32.7 |
| 3,020,232 | 2/1962 | Doughty | 252/8.5 C |
| 3,410,797 | 11/1968 | Walker | 252/8.5 C |
| 3,810,836 | 5/1974 | Norton | 252/8.5 C |
| 3,826,798 | 7/1974 | Udelhofen et al. | 252/46.6 X |
| 3,849,317 | 11/1974 | Walker | 252/8.5 A |
| 3,850,822 | 11/1974 | Steere et al. | 252/46.6 X |
| 4,110,231 | 8/1978 | Swanson | 252/8.5 C |
| 4,177,154 | 12/1979 | Chakrabarti | 252/49.3 X |
| 4,322,301 | 3/1982 | Blackmore | 252/8.5 A |
| 4,427,556 | 1/1984 | House | 252/8.5 C X |
| 4,451,389 | 5/1984 | Clear | 252/8.5 C X |

*Primary Examiner*—Herbert B. Guynn
*Assistant Examiner*—Catherine S. Kilby
*Attorney, Agent, or Firm*—Jack H. Park; Kenneth R. Priem; Harold J. Delhommer

[57] ABSTRACT

Disclosed are novel aqueous drilling fluid compositions containing a lubrication additive and a method of drilling wells wherein the underground formation is contacted with such drilling fluid compositions. The lubrication additive is a polyolefin in aqueous solution having a molecular weight between about 500 and about 2000 with one or more substituent groups of the formula:

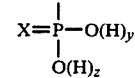

where X is sulfur or oxygen, y is 0 or 1 and z is 0 or 1, provided that either y or z=1.

14 Claims, No Drawings

LUBRICATION ADDITIVE FOR AQUEOUS DRILLING FLUIDS

BACKGROUND OF THE INVENTION

This invention relates to a novel additive for aqueous drilling fluids and a method for drilling wells in subsurface formations utilizing drilling fluids containing the additive. More particularly, the additive functions as a lubricant to substantially reduce torque in rotating drill stems.

Drilling fluids, or drilling muds as they are sometimes called, are slurries of clay solids used in the drilling of wells in the earth, particularly for the purpose of recovering hydrocarbons and other fluid materials. Drilling fluids have a number of functions, the most important of which are: lubricating the drilling tool and drill pipe which carries the tool, removing formation cuttings from the well, counterbalancing formation pressures to prevent the inflow of gas, oil or water from permeable rocks which may be encountered at various levels as drilling continues, and holding the cuttings in suspension in the event of a shutdown in the drilling and pumping of the drilling fluid.

An ideal drilling fluid is a thixotropic fluid, which is a fluid whose viscosity decreases as the degree of agitation or shear rate increases. Such fluids are desirable to reduce torque on a rotating drill string as well as support and remove formation cuttings from the well. Frequently, these two purposes are difficult to achieve at the same time. Consequently, certain materials are normally added to aqueous drilling muds for lubrication to decrease torque on the drill string.

U.S. Pat. No. 3,410,797 describes the lubricant use of a stannous dithiophosphate and a dibutyltin didecyl dithiophosphate in aqueous drilling muds. Phosphosulfurized olefins for drilling fluid lubricants are also disclosed in U.S. Pat. No. 3,810,836.

Examples of lubricants now used in aqueous drilling fluids include such proprietary materials as Torq-Trim II, a trademarked material sold by NL Baroid; Magcolube, a trademarked lubricant sold by Magcobar; Lubri-Sal, a trademarked additive sold by Milchem Inc.; and SWS, a trademarked lubricant sold by IMCO Services. These prior art additives may be used for lubrication in certain types of aqueous drilling fluids, most notably aqueous lignosulfonate muds. However, in other types of muds, they may be completely inadequate. Other lubrication additives include surfactants which create foaming problems and precipitation problems in hard waters. Polymer beads are sometimes employed to enhance the rotation of the drill bit but are difficult to work with primarily because their large size creates severe separation problems in the recycling of drilling fluids.

Special purpose drilling fluids are used in certain geographical areas where the well must penetrate formations known as heaving or sloughing shales. Aqueous drilling fluids containing hydroxides and other water soluble alkali metal and alkali earth metal salts have been frequently employed for drilling the type of heaving shales encountered in the Gulf Coast region of the United States. These lime based systems cannot be lubricated with the most common additives because the high pH and soluble calcium present in lime base systems render most drilling fluid lubricants ineffective. Fatty acid ester lubricants are hydrolized to fatty acids which precipitate out with calcium.

The additional fact that many Gulf Coast wells are highly deviated increases the need for lubricants to be used with the lime based systems frequently employed with unstable Gulf Coast shales. In deviated wells, greater lubrication is needed because the drill string is more likely to be lying against the side of the borehole. A deviated well also increases the likelihood of shale on the sides of the borehole becoming unstable, which increases the need to use lime based mud systems.

A wide variety of lubrication additives are commercially available for use with high pH lime drilling fluid systems. Only a few of these offer satisfactory torque reductions and most of those that provide substantial lubrication adversely affect the drilling fluid system.

When added to a lime:Mor-Rex system in 2% by volume quantities and tested according to Ex. 1, the trademarked product AZ-32 sold by Petroleum Associates of Lafayette, Inc. offered insignificant torque reductions of 3–4%. Similar results were found with the trademarked additives Lubrisal, Shale Heal and Torque Trim II, sold by Milchem, Gill Industries and NL Baroid, respectively. The trademarked additives G.M.L., ReDou Torque, and SDL-711, sold by Frontier Research, Oil-Base Germany and Superior Chemicals, respectively, yielded modest torque reductions of about 15–23%.

Magcolube, a trademarked product sold by Magcobar, Inc. yielded 22% reduction in torque but caused the drilling fluid to bead up and grease out the barite, an intolerable problem. Finally, E. P. Mud Lube, a trademarked product of NL Baroid caused foaming problems and also caused a greasing problem with the barite.

Accordingly, there is a substantial need for additives for use in aqueous drilling fluids, particularly hydroxide based mud systems, to lubricate the drill string and reduce torque loads.

SUMMARY OF THE INVENTION

The invention includes both aqueous drilling fluid compositions containing the lubrication additive set forth below and a method of drilling wells wherein the formation is contacted with such drilling fluid compositions. It has been discovered that torque on a drill string can be substantially reduced by the employment of aqueous drilling fluids having a pH greater than about 8 containing in solution about 0.2 to about 3.0% by volume of polyolefins having a molecular weight between about 500 and about 2000 with one or more substituents groups of the formula:

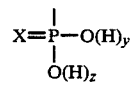

where x is sulfur or oxygen, y is 0 or 1 and z is 0 or 1, provided that either y or z=0. Before dissociation when placed in solution, the substituent group of the lubrication additive may contain many other atoms. The substituent group may be

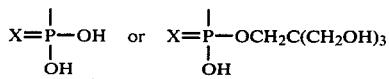

or many other variations. But upon being placed in solution, the invention additive will dissociate in a low pH drilling fluid of about 8 to 11 or a higher pH drilling fluid of greater than 11 to

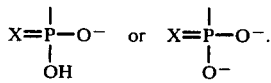

DETAILED DESCRIPTION

The use of aqueous drilling fluids containing in solution a polyolefin chain with the substituent group

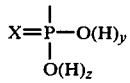

according to the invention can achieve torque reductions in the drill string in the range of about 25 percent to about 60 percent with little or no distortion in the properties of the drilling muds. Because of the lubrication properties of the invention additive and its lack of reactability with drilling muds and their operating environments, the present invention fills a long felt need for an effective lubricant, particularly in sloughing shale environments.

The lubrication additives of the present invention when in aqueous solution are polyolefins having a molecular weight between about 500 and 2000 with one or more substituent groups of the formula:

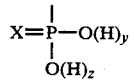

where X is sulphur or oxygen, y is 0 or 1 and z is 0 or 1, provided that y or z=0. Preferably, the polyolefin chain out of solution will be a polybutene having a molecular weight between about 900 and 1700 with a substituent group having the formula:

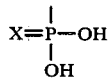

where X is sulphur or oxygen. In most cases, X will be sulfur in some of the lubrication additive molecules and X will be oxygen in other additive molecules. This is because it is practically impossible to hydrolyze all of the double bond sulfur atoms in the substituent group to oxygen during the preparation of the lubrication additive.

The lubrication additive out of solution may have the following formula for its one or more substituent groups bonded to the polyolefin chain,

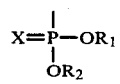

where $R_1$ and $R_2$ are hydrogen or $-CH_2C(CH_2OH)_3$, provided that either $R_1$ or $R_2$ is hydrogen.

The present invention is applicable to any water-based mud system wherein the invention additive is employed in quantities of about 0.2 to about 3.0 volume percent, most preferably about 0.3 to about 2.0 volume percent of drilling fluid. It is particularly applicable to hydroxide based mud systems which render ineffective most lubricating additives. Chief among these systems are those based upon the use of lime and polysaccharide additives such as Mor-Rex, a trademarked group of polysaccharides sold by Grain Processing Corporation. Mor-Rex comprises hydrolyzed cereal solids which are chiefly polysaccharides and is added to aqueous lime drilling fluids to reduce gel strengths and yield points. Lime:Mor-Rex fluid systems are chiefly used in the Gulf Coast area where unstable shale formations exist. The invention also has considerable application to lime:-lignosulfonate drilling fluids, lignosulfonate drilling fluid systems, gypsum based fluid systems, saturated sodium chloride brine systems and polymer based non-dispersed fluid systems.

A typical lime:Mor-Rex fluid system according to the invention will contain about 0.2% to about 3.0% by volume of the invention additive, about 1 to about 8 lb/bbl of lime and about ⅛ to about 8 lb/bbl of polysaccharide and a pH greater than about 12.

The invention also encompasses a method of drilling a well wherein an aqueous drilling fluid containing the invention lubrication additive in solution is circulated in the well in contact with the underground formations.

The following examples will further illustrate the novel aqueous drilling fluids of the present invention containing the instant lubrication additive. These examples are given by way of illustration and not as limitations on the scope of the invention. Thus, it should be understood that the composition of the aqueous drilling fluids may be varied to achieve similar results within the scope of the invention.

TABLES 1–6

Various amounts and samples of the polymeric phosphonates of the present invention were tested in lime:-Mor-Rex drilling fluid systems, lignosulfonate fluid systems, lime:lignosulfonate fluids and low-solids shale-control fluids. The two polymeric phosphonates tested were two compounds sold under the trademarks TC-9551 and TC-9781 by Texaco Chemical Co. TC-9551 is a mixture of alkenethiophosphonic acid, polybutene and a hydrocarbon diluent oil. The TC-9551 has a polybutene chain with a molecular weight of about 1300 and the substituent group,

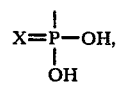

where X is both sulphur and oxygen. The TC-9781 agent is the TC-9551 molecule which has been reacted with pentaerithritol to form an ester. It differs from the TC-9551 molecular formula in that either $R_1$ or $R_2$ is $CH_2C(CH_2OH)_3$ rather than a hydrogen atom.

Several drilling fluid systems were prepared according to the tables using Aqua Gel, a trademarked bentonite clay of NL Baroid Inc. and Q-Broxin, a trademarked ferrochrome lignosulfonate sold by NL Baroid Inc. The lime:Mor-Rex system of Table 1 contained approximately 25 pounds per barrel of Aqua Gel, 3 pounds per barrel of lime, 3 pounds per barrel of Mor-Rex and 1 pound per barrel of caustic soda. The lignosulfonate fluid system of Table 2 was also prepared containing 25 pounds per barrel of Aqua Gel, 3 pounds per barrel of Q-Broxin and sufficient caustic soda to adjust the pH of the fluid to 10.

The lubricant evaluations were performed on a lubrication testing apparatus designed to measure torque on a stainless steel shaft that was rotated in a Berea Sandstone borehole. The shaft-sandstone interface was submerged in a circulating mud system and the shaft was forced by various loads to rub against the sandstone face. Torque measurements were obtained at the various loads both before and after treatment with the lubricant additives. Results were reported as percentage reduction in torque for each load. A desirable result is a substantial reduction in torque (greater than 20%) that is maintained across the range of loads.

Table 1 illustrates the superb results obtained from using TC-9551 as a lubrication additive in lime:Mor-Rex fluids. It can be seen that torque reductions of 39% to 50% were obtained with treatments of 0.12 to 1.0% by volume of TC-9551. Not only is this an excellent response for very low treatment levels, but the reductions are nearly constant across the range of loads applied. Furthermore, the TC-9551 showed superb results with very low treatment levels of 0.25% and 0.12% by volume indicating that very little extra costs would be incurred in adding this highly efficacious lubrication additive. This compares very favorably with torque reductions of 15% to 20% in lime:Mor-Rex fluid systems obtained from the very best of the prior art lubrication additives at prior art treatment levels of 1% to 2% by volume. Furthermore, the prior lubrication additives usually cause undesirable effects on the drilling fluid systems such as foaming or greasing out the barite.

Tables 2-4 also illustrate that the alkenethiophosphonate also works well as a lubrication additive in other aqueous drilling fluid systems such as lignosulfonate muds, lime:lignosulfonate muds and low-solids shale-control fluids. But as Tables 2 and 3 indicate, the alkenethiophosphonate is somewhat less effective in lignosulfonate fluid systems, producing an average 20% torque reduction. The TC-9551, however, was highly effective in reducing torque in the low-solid shale-control fluid, wherein a 1% by volume amount of the alkenethiophosphonate produced torque reductions of about 50%. Furthermore, the effectiveness appeared to increase as the load increased.

Tables 5 and 6 indicate that the alkenethiophosphonate ester TC-9781 gave consistent torque reductions of 25% to 30% treatment levels of 1% to 2% by volume in lime:Mor-Rex drilling fluid systems. In addition, it should be noted that the effect was consistent over the range of loads and did not fall off at higher loads. Table 6 indicated that the alkenethiophosphonate ester was unsatisfactory as a lubrication additive in lignosulfonate systems.

TABLES 7-10

In order to determine if the alkenethiophosphonates have any effect on other fluid properties, the materials were added to weighted and unweighted lime:Mor-Rex systems in Tables 7-10. Generally, all compatibility tests showed virtually no change in fluid properties with the addition of the alkenethiophosphonates. Similar results were also achieved with compatibility tests run on lignosulfonate fluid systems containing the alkenethiophosphonates.

The standard API drilling fluid tests were run according to the procedure recommended by the API and published in *Standard Procedure For Testing Drilling Fluids*, American Petroleum Institute, Washington, D.C. (9th ed. 1982). The tests conducted were plastic viscosity (PV in cp), yield point (YP in lbs/100 ft$^2$), gel strength after sitting for ten seconds and after sitting for ten minutes reported in lbs/100 ft$^2$. (If the testing tube sinks to the bottom in less than sixty seconds, shear strength is reported as 0 lbs/100 ft$^2$ with a superscript indicating the time in seconds to sink to the bottom.), API fluid loss (in cc/30 min), low temperature low pressure filtrate (LTLP in cc/30 min), phenolphthalein filtrate alkalinity ($P_f$ in cc of 0.02N $H_2SO_4$ per cc of sample to reach the phenolphthalein end point), phenolphthalein mud alkalinity ($P_m$ in cc of 0.02N $H_2SO_4$ per cc of sample to reach the phenolphthalein end point), calcium ion content (mg/liter of filtrate), and chlorine ion content (chlorides in mg/liter of filtrate).

The battery of standard API recommended fluid tests of Tables 7-10 were conducted with the base fluids listed in each table. These contained a native solids, top-hole mud from South Louisiana and other components including a lignite sold under the tradename Carbonox by N. L. Baroid and a synthetically formulated resin sold under the tradename Resinex by Magcobar.

Tables 7-10 illustrate that the alkenethiophosphonates had no substantial adverse effects on the rheological properties of the lime:Mor-Rex fluid systems, both weighted and unweighted. All properties in each fluid system remained approximately the same after treatment with the lubrication additive as for the base fluid systems. Thus, the use of the alkenethiophosphonates of the present invention in aqueous drilling fluid systems should present no problems in controlling the properties of the fluid systems.

It is most interesting that the TC-9781 ester is an effective lubricant in a high-pH lime fluid but is ineffective in a low-pH lignosulfonate fluid. This is directly opposite the effect normally observed in these particular systems with the fatty acid esters that are the usual constituents of the commercially available drilling fluid lubricants. The prior art fatty esters are effective lubricants for use in low-pH systems but are ineffective in the high-pH lime systems where they are saponified to calcium soap.

It is theorized that the thiophosphonate ester of the TC-9781 is hydrolyzed in the high-pH lime:Mor-Rex fluid system to the calcium salt of a phosphonic acid to provide the active lubrication species. This would tend to explain why alkenethiophosphonate ester (TC-9781) is ineffective in a low-pH lignosulfonate system. In the lignosulfonate system, the ester would not be hydrolyzed so that the theorized active lubricant species would not be generated. This theory is reinforced by the success of the alkenethiophosphonate TC-9551 in both the high-pH lime:Mor-Rex and low-pH lignosulfonate drilling fluid systems.

TABLE 1

EVALUATION OF TC-9551 AS A LUBRICANT IN A LIME:MOR-REX FLUID

| | LOAD (gm) | TORQUE REDUCTION (percent) |
|---|---|---|
| TC-9551 (1% by volume) | 500 | 53 |
| | 1000 | 51 |
| | 1500 | 49 |
| | 2000 | 48 |
| | AVER. | 50 |
| TC-9551 (0.5% by volume) | 500 | 43 |
| | 1000 | 44 |
| | 1500 | 42 |
| | 2000 | 44 |
| | AVER. | 43 |
| TC-9551 (0.25% by volume) | 500 | 39 |
| | 1000 | 40 |
| | 1500 | 41 |
| | 2000 | 46 |
| | AVER. | 41 |
| TC-9551 (0.12% by volume) | 500 | 40 |
| | 1000 | 40 |
| | 1500 | 38 |
| | 2000 | 39 |
| | AVER. | 39 |

TABLE 2

EVALUATION OF TC-9551 AS A LUBRICANT IN A LOW-pH LIGNOSULFONATE MUD

| | LOAD (gm) | TORQUE REDUCTION (percent) |
|---|---|---|
| TC-9551 (1% by volume) | 500 | 26 |
| | 1000 | 21 |
| | 1500 | 29 |
| | 2000 | 5 |
| | AVER. | 20 |
| TC-9551 (2% by volume) | 500 | 28 |
| | 1000 | 12 |
| | 1500 | 15 |
| | 2000 | 10 |
| | AVER. | 16 |

TABLE 3

EVALUATION OF TC-9551 AS A LUBRICANT IN A LIME:LIGNOSULFONATE MUD

| | LOAD (gm) | TORQUE REDUCTION (percent) |
|---|---|---|
| A. BASE: | | |
| Q-Broxin (4 lb/bbl) | 500 | 23 |
| Lime (1 lb/bbl) | 1000 | 20 |
| Caustic soda (1 lb/bbl) | 1500 | 18 |
| Gel (25 lb/bbl) | 2000 | 17 |
| TREATMENT: | | |
| TC-9551 (1% by vol.) | | |
| | AVER. | 20 |
| B. BASE: | | |
| Q-Broxin (4 lb/bbl) | 500 | 18 |
| Lime (2.5 lb/bbl) | 1000 | 18 |
| Caustic Soda (1 lb/bbl) | 1500 | 21 |
| Gel (25 lb/bbl) | 2000 | 20 |
| TREATMENT: | | |
| TC-9551 (1% by vol.) | | |
| | AVER. | 19 |
| C. BASE: | | |
| Q-Broxin (4 lb/bbl) | 500 | 12 |
| Lime (4 lb/bbl) | 1000 | 10 |
| Caustic Soda (1 lb/bbl) | 1500 | 12 |

TABLE 3-continued

EVALUATION OF TC-9551 AS A LUBRICANT IN A LIME:LIGNOSULFONATE MUD

| | LOAD (gm) | TORQUE REDUCTION (percent) |
|---|---|---|
| Gel (25 lb/bbl) | 2000 | 12 |
| TREATMENT: | | |
| TC-9551 (1% by vol.) | | |
| | AVER. | 12 |

TABLE 4

EVALUATION OF TC-9551 AS A LUBRICANT IN A LOW-SOLIDS SHALE-CONTROL FLUID

| | LOAD (gm) | TORQUE REDUCTION (percent) |
|---|---|---|
| TC-9551 (1% by volume) | 500 | 39 |
| | 1000 | 47 |
| | 1500 | 49 |
| | 2000 | 52 |
| | AVER. | 47 |

BASE: Saturated NaCl brine
Lime 7 lb/bbl

TABLE 5

LUBRICANT EVALUATION TC-9781 IN LIME:MOR-REX
MEASURED TORQUE (inch ounces)

| LOAD (gms) | UN-TREATED | TREATED | TORQUE REDUCTION (%) |
|---|---|---|---|
| 0.5% by volume TC-9781 | | | |
| 500 | 16.5 | 14.5 | 12 |
| 1000 | 31.5 | 27.0 | 14 |
| 1500 | 44.5 | 37.5 | 16 |
| 2000 | 58.5 | 50.0 | 15 |
| 1% by volume TC-9781 | | | |
| 500 | 15.5 | 11.0 | 29 |
| 1000 | 30.0 | 23.0 | 23 |
| 1500 | 43.0 | 32.5 | 24 |
| 2000 | 58.0 | 44.5 | 23 |
| 1% by volume TC-9781 | | | |
| 500 | 15.0 | 11.0 | 27 |
| 1000 | 30.0 | 21.5 | 28 |
| 1500 | 42.0 | 31.0 | 26 |
| 2000 | 55.5 | 41.5 | 25 |
| 2% by volume TC-9781 | | | |
| 500 | 15.0 | 11.0 | 27 |
| 1000 | 28.5 | 21.0 | 26 |
| 1500 | 42.0 | 30.5 | 27 |
| 2000 | 54.5 | 38.0 | 30 |

BASE: Lime: 3 lb/bbl  Mor-Rex: 2 lb/bbl
Caustic Soda: 1 lb/bbl in 25 lb/bbl gel

TABLE 6

LUBRICANT EVALUATION TC-9781 IN LIGNOSULFONATE MUD
MEASURED TORQUE (inch ounces)

| LOAD (gms) | UN-TREATED | TREATED | TORQUE REDUCTION (%) |
|---|---|---|---|
| 1% by volume TC-9781 | | | |
| 500 | 17.0 | 21.5 | −26 |
| 1000 | 29.5 | 32.0 | −8 |
| 1500 | 41.0 | 39.5 | 4 |
| 2000 | 50.0 | 50.0 | 0 |
| 2% by volume TC-9781 | | | |
| 500 | 14.0 | 15.0 | −7 |
| 1000 | 26.0 | 23.5 | 10 |
| 1500 | 35.5 | 31.5 | 11 |
| 2000 | 45.0 | 40.0 | 11 |
| 4% by volume TC-9781 | | | |
| 500 | 15.5 | 16.5 | −6 |
| 1000 | 26.5 | 28.0 | −6 |
| 1500 | 38.5 | 40.0 | −4 |
| 2000 | 56.0 | 46.5 | 17 |

BASE: Q-Broxin: 3 lb/bbl  Caustic Soda: to pH 10
in 25 lb/bbl gel

TABLE 7

COMPATIBILITY TESTING TC-9551 WITH A 9.5 LB/GAL LIME:MOR-REX SYSTEM

| TC-9551 (% by volume) | 0 | 0.5 | 1 | 2 |
|---|---|---|---|---|
| Plastic Viscosity | 21 | 17 | 15 | 17 |
| Yield Point | 0 | 0 | 4 | 5 |
| Gels | | | | |
| 10 sec | $0^1$ | $0^1$ | $0^1$ | $0^1$ |
| 10 min | $0^1$ | $0^1$ | $0^1$ | $0^1$ |
| LTLP Filtrate | 15.2 | 13.3 | 12.5 | 12.2 |
| $P_m$ | 13.4 | 12.3 | 12.6 | 12.3 |
| $P_f$ | 3.3 | 3.3 | 3.3 | 3.3 |
| Chlorides | 3700 | 3800 | 3700 | 3700 |
| Calcium | 330 | 280 | 325 | 295 |

Base: Lime 4 lb/bbl
Mor-Rex 2 lb/bbl
Caustic Soda 1 lb/bbl
Carbonox 2 lb/bbl
Resinex 4 lb/bbl
in a native solids mud (Broussard)

TABLE 8

COMPATIBILITY TESTING TC-9551 WITH A 16.0 LB/GAL LIME:MOR-REX SYSTEM

| TC-9551 (% by volume) | 0 | 0.5 | 1 | 2 |
|---|---|---|---|---|
| Plastic Viscosity | 28 | 39 | 35 | 37 |
| Yield Point | 5 | 3 | 8 | 2 |
| Gels | | | | |
| 10 sec | $0^2$ | $0^3$ | $0^3$ | $0^3$ |
| 10 min | $0^{38}$ | $0^{40}$ | $0^{33}$ | $0^{39}$ |
| LTLP Filtrate | 10.5 | 10.6 | 10.1 | 10.6 |
| $P_m$ | 10.9 | 10.1 | 10.7 | 10.5 |
| $P_f$ | 2.8 | 2.7 | 2.7 | 2.6 |
| Chlorides | 4000 | 3900 | 4000 | 3600 |
| Calcium | 315 | 330 | 300 | 360 |

Base: Lime 4 lb/bbl
Mor-Rex 2 lb/bbl
Caustic Soda 1 lb/bbl
Carbonox 2 lb/bbl
Resinex 4 lb/bbl
Barite to 16.0 lb/gal

TABLE 8-continued

COMPATIBILITY TESTING TC-9551 WITH A 16.0 LB/GAL LIME:MOR-REX SYSTEM

| TC-9551 (% by volume) | 0 | 0.5 | 1 | 2 |
|---|---|---|---|---| in a native solids mud (Broussard)

TABLE 9

COMPATIBILITY TESTING TC-9781 IN LIME:MOR-REX (9.5 lb/gal)

| Treatment (TC-9781 % by volume) | 0 | 0.5% | 1.0% | 2.0% |
|---|---|---|---|---|
| Plastic Vis. | 24 | 26 | 19 | 21 |
| Yield Point | 0 | 0 | 0 | 0 |
| 10 sec gel | $0^1$ | $0^1$ | $0^1$ | $0^1$ |
| 10 min gel | $0^1$ | $0^1$ | $0^1$ | $0^1$ |
| API Fluid Loss | 19.6 | 19.2 | 18.4 | 18.8 |
| $P_m$ | 13.2 | 12.8 | 12.8 | 12.5 |
| $P_f$ | 2.7 | 2.9 | 2.8 | 2.8 |
| Chlorides | 3400 | 3500 | 3700 | 3500 |
| Calcium | 160 | 160 | 180 | 160 |

BASE: Lime: 3 lb/bbl  Mor-Rex: 3 lb/bbl
Caustic Soda: 1 lb/bbl in a native solids mud (Broussard)

TABLE 10

COMPATIBILITY TESTING TC-9781 IN LIME:OR-REX (17.7 lb/gal)

| Treatment | 0 | 0.5% | 1.0% | 2.0% |
|---|---|---|---|---|
| Plastic Vis. | 95 | 106 | 115 | 118 |
| Yield Point | 35 | 29 | 35 | 37 |
| 10 sec gel | $0^{30}$ | $0^{40}$ | $0^{40}$ | $0^{35}$ |
| 10 min gel | 4.0 | 4.0 | 4.0 | 4.0 |
| API Fluid Loss | 3.7 | 3.6 | 3.6 | 3.3 |
| $P_m$ | 15.0 | 12.5 | 13.9 | 14.4 |
| $P_f$ | 3.6 | 3.4 | 3.7 | 3.4 |
| Chlorides | 2500 | 2500 | 2500 | 2500 |
| Calcium | 310 | 300 | 320 | 250 |

BASE: Lime: 4 lb/bbl  Mor-Rex: 3 lb/bbl
Caustic Soda: 1.2 lb/bbl  Carbonox: 6 lb/bbl
In a Gel:Water/Broussard Mud Mixture Many other variations and modifications may be made in the concept described above by those skilled in the art without departing from the concept of the present invention. Accordingly, it should be clearly understood that the concepts disclosed in the description are illustrative only and are not intended as limitations on the scope of the invention.

What is claimed is:

1. An aqueous drilling fluid having a pH greater than about 8 and having about 0.2% to about 3% volume of a lubrication additive, said lubrication additive comprising:

a polyolefin in solution having a molecular weight of about 500 to about 2000 and having one or more substituent groups of the formula:

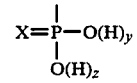

wherein x is sulfur or oxygen, y is 0 or 1 and z is 0 or 1, provided that either y or z=0.

2. The fluid of claim 1, wherein the polyolefin is a polybutene.

3. The fluid of claim 1, wherein more than one substituent groups are present and X is sulfur for some of said substituent groups and X is oxygen for some of said substituent groups of the lubrication additive.

4. The fluid of claim 1, wherein the fluid further comprises calcium hydroxide.

5. The fluid of claim 1, wherein the fluid further comprises lignosulfonates.

6. The fluid of claim 1, wherein the fluid further comprises polysaccharides.

7. The fluid of claim 1, wherein the fluid further comprises lignosulfonates.

8. The fluid of claim 1, wherein the fluid further comprises gypsum.

9. The fluid of claim 1, wherein the fluid further comprises a saturated sodium chloride brine.

10. The fluid of claim 1, wherein the fluid has pH greater than about 12.

11. An aqueous drilling fluid having about 0.3% to about 2.0 percent by volume of a lubrication additive, said lubrication additive comprising a polybutene having a molecular weight of about 500 to about 2000 with one or more substituent groups of the formula:

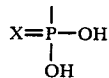

where X is sulfur or oxygen.

12. An aqueous drilling fluid comprising,
about 0.2% to about 3.0% by volume of a lubrication additive;
about 1 to about 8 lb/bbl of calcium hydroxide; and
about ⅛ to about 8 lb/bbl of polysaccharide,
said lubrication additive comprising a polybutene having a molecular weight of about 900 to about 1700 with one or more substituent groups of the formula:

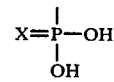

where X is sulfur or oxygen.

13. An aqueous drilling fluid having about 0.2% to about 3% by volume of a lubrication additive, said lubrication additive comprising:
a polyolefin having a molecular weight between about 500 and about 2000 with one or more substituent groups of the formula:

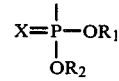

where X is sulfur or oxygen, $R_1$ is hydrogen or $-CH_2C(CH_2OH)_3$ and $R_2$ is hydrogen or $-CH_2C(CH_2OH)_3$ provided that either $R_1$ or $R_2$ is hydrogen.

14. A method of drilling wells in the earth wherein an aqueous drilling fluid with a pH greater than about 8 is circulated in the well in contact with earth formations during drilling, said fluid containing about 0.2% to about 3% by volume of a polyolefin in solution having a molecular weight of about 500 to about 2000 and having one or more substituent groups of the formula

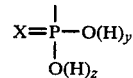

wherein x is sulfur or oxygen, y is 0 or 1 and z is 0 or 1, provided that either y or z=0.

* * * * *